United States Patent

[11] 3,607,413

| [72] | Inventor | Edward S. Buzzelli<br>Solon, Ohio |
|---|---|---|
| [21] | Appl. No. | 758,894 |
| [22] | Filed | Sept. 10, 1968 |
| [45] | Patented | Sept. 21, 1971 |
| [73] | Assignee | The Standard Oil Company<br>Cleveland, Ohio<br>Continuation-in-part of application Ser. No.<br>518,473, Jan. 3, 1966, now Patent No.<br>3,445,288. |

[54] METHOD FOR ELECTROCHEMICAL ALLOYING OF ALUMINUM AND LITHIUM
8 Claims, 2 Drawing Figs.

[52] U.S. Cl. .......................................................... 136/76,
204/39, 204/71
[51] Int. Cl. ............................................................ H01m35/30
[50] Field of Search............................................ 136/6, 83,
20, 76, 34, 100, 120; 204/39, 71

[56] References Cited
UNITED STATES PATENTS

| 1,869,493 | 8/1932 | Osborg ......................... | 204/71 |
| 1,901,407 | 3/1933 | Osborg ......................... | 204/71 |
| 3,385,776 | 5/1968 | Fiedler ......................... | 204/71 |
| 3,410,730 | 11/1968 | Rightmire et al. ............ | 136/83 |
| 3,410,731 | 11/1968 | Rightmire et al. ............ | 136/83 |
| 3,413,151 | 11/1968 | Adams et al. ................. | 136/83 |
| 3,428,493 | 2/1969 | Adams ......................... | 136/100 |
| 3,445,288 | 5/1969 | Buzzelli ........................ | 136/6 |

*Primary Examiner*—Winston A. Douglas
*Assistant Examiner*—C. F. Lefevour
*Attorneys*—John F. Jones and Sherman J. Kemmer ABSTRACT: Method for electrochemical alloying of aluminum and lithium by immersing a pair of electrodes, one being of aluminum, into a molten bath of lithium salt or salts, and imposing a potential to electrolyze the molten salt and drive lithium into aluminum.

PATENTED SEP 21 1971  3,607,413

INVENTOR
EDWARD S. BUZZELLI
BY
Leland L. Chapman
ATTORNEY

METHOD FOR ELECTROCHEMICAL ALLOYING OF ALUMINUM AND LITHIUM

This application is a continuation-in-part of application Ser. No. 518,473 filed Jan. 3, 1966 now U.S. Pat. No. 3,445,288.

This invention relates to an electrical energy storage device, and more particularly, to a chemical energy storage cell or battery of a metallic, negative electrode, most commonly a porous, carbon positive electrode and an alkali metal-halide electrolyte, wherein there is coaction between the electrodes and the electrolyte causing an electrical potential to be produced between the electrodes externally of the cell. It is therefore to be understood that the term "cell" is meant in its broadest sense of two electrodes immersed in an electrolyte in a container.

Energy can be stored electrostatically, as in an electrical capacitor unit, or it can be stored chemically as in an electrical energy storage cell or battery. However, both of such means of energy storage are unfitted for continuous, commercial use involving a constant electrical energy drain in that the former, while permitting quick charge, also permits discharge in a relatively short period of time and low energy storage; and the latter, although much superior for the actual storage of electricity, because of high power delivery and slow discharge, suffers by lacking a quick charging means. It is therefore postulated that the ideal electrical energy storage cell combines the advantage of quick charge of the capacitor unit and the advantage of slow discharge of the battery. Consequently, research and development work, involving electrical energy storage devices, has proceeded along the lines of combining the advantages of both types of units into a single energy storage device. To accomplish this end, the invention herein described contemplates construction of such a cell with a novel electrode composition.

Accordingly, it is an object of the present invention to produce an electrical energy storage device of quick charge and high power delivery.

This and other objects of the invention will become more apparent to those skilled in the art from the following detailed description and drawings in which.

Figure 1:
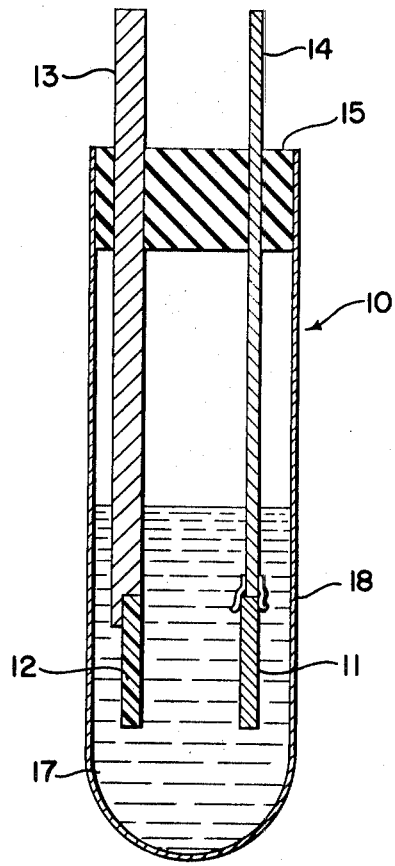
FIG. 1 is a perspective view of an electrical energy storage device.

According to the present invention, it has been discovered that high power delivery and rapid charge, and discharge above the range of a conventional lead-acid storage battery, can be obtained from an electrical energy storage cell comprising a pair of electrodes, at least one of which is a negative electrode comprising aluminum and lithium, the electrode being immersed or in contact with a fused alkali halide electrolyte, hereinafter described in more detail. The fast charging characteristics of the device are attributed, to a large measure, to the highly reversible aluminum-lithium electrode of the cell. The positive electrode, opposed to the aluminum-lithium negative electrode, can be carbon or any other suitable stable material.

The aluminum-lithium electrode can be produced by electrochemically charging a substantially pure aluminum electrode in an electrolyte containing lithium halide salt or salts, the term halide including chloride, bromide, and fluoride. This method is effected by immersing a positive and a negative electrode into a molten electrolyte. An aluminum bar is made the negative electrode while carbon, graphite, or another bar, may function as the positive electrode. The impressed voltage on the negative electrode is in the range of −3.35 volts, with respect to chlorine reference electrode. The impressed voltage may be either lower or higher, depending on the temperature of the molten electrolyte and the particular alloy that is being formed. The required voltage will diminish at higher temperatures since less energy would be required to deposit lithium on aluminum.

At the start of the electrochemical process, the voltage is at −2.2, with respect to chlorine reference electrode, but then rapidly rises to −3.35 volts, with respect to chlorine reference electrode. This voltage plateau is maintained until an aluminum-lithium alloy containing about 18 percent lithium is formed. Up to about 18 percent lithium, the aluminum-lithium alloy is a solid-state alloy at temperatures of up to about 500° C. If the electrochemical process is continued, the voltage will increase and another plateau is encountered. The aluminum-lithium alloys containing more than about 18 percent lithium are liquid, as is apparent from the aluminum-lithium phase diagram. The progress of a voltage versus percent lithium in the aluminum-lithium alloy can also be predicted from aluminum-lithium phase diagram. The current density should be in the range of 200–500 milliamps per square centimeter, since at considerably higher current densities, such as for example about 1,000 milliamps per square centimeter, lithium accumulates at such a rapid rate that a layer of liquid lithium forms on the face of the negative electrode. Because of the lower specific gravity, lithium floats upwardly to the surface of the molten electrolyte. This condition results from the fact that diffusion rate of lithium through the molten electrolyte is higher than through the aluminum electrode.

The aluminum-lithium electrode can also be produced by melting a mixture containing a predetermined amount of each metal to form an alloy of aluminum-lithium.

The aluminum-lithium alloy of the electrode comprises aluminum in amounts of from about 70 to 95 weight percent, based on total composition, and from about 5 to 30 weight percent, based on total composition, lithium. Impurities such as, for example, copper, magnesium, manganese, indium and iron may be present in quantities less than 10 weight percent, based on total composition. An aluminum-lithium electrode of this range of composition operates at substantially constant voltage and exhibits high storage capabilities.

The aluminum-lithium electrode is capable of storing lithium metal of the electrolyte without forming an extensive liquid. Hence, the electrode remains solid, which solid electrode is capable of diffusing the lithium metal of the electrolyte through its structure. It has been found that on charge of the cell comprising the aluminum-lithium electrode, the electrode structure expands, wherein lithium metal of the electrolyte enters the electrode structure; on discharge, the lithium metal leaves the electrode structure. The electrode must, therefore, be able to withstand the stresses of expansion and contraction. For this reason, the aluminum-lithium metal electrode is preconditioned prior to use.

The electrode material is preconditioned by slow charge and discharge initially. This slow preconditioning results in an electrode of substantially uniform aluminum-lithium distribution and which electrode facilitates the takeup and release of the lithium metal upon the subsequent fast charge and discharge of a cell containing the electrode. If the initial charge and discharge cycles of the preconditioning are carried out too rapidly, local regions of liquid metal alloy are built up, and the result is pitting of the aluminum-lithium electrode, which pitting has a deleterious effect when the electrodes are put into routine use. Evidence of such pitting is visible as lithium agglomeration. Aluminum-lithium electrodes cycled by slow charge and discharge show a fine, even distribution of the lithium metal in the aluminum.

Opposed to the aluminum-alkali metal electrode of this invention is a positive electrode comprising, as for example, carbon.

Generally speaking, the electrolyte used in the electric energy storage device herein described comprises a source of ions which are mobile, and most commonly, in the molten state at a temperature above about 250° C., and which electrolyte is derived from crystalline materials characterized by predominantly ionic lattice when in the crystalline state and can be disassociated to provide the requisite ion content and mobility in the molten state. When heated above their melting point, the crystalline compounds, or mixtures thereof, are considered as dissolved in each other, and each of the components of the crystalline material provides mobile ions. The mobile ions of the preferred embodiment of this invention are alkali and halide ions.

Typical examples of materials which can be used as electrolytes include salts of metals, and mixtures of such salts, and advantageously eutectic mixtures thereof, as for example binary systems of LiCl-KCl, LiBr-KBr, LiBr-NaBr, LiBr-LiF, and ternary systems, as for example $CaCl_2$-LiCl-KCl, LiCl-KCL-NaCl; $CaCl_2$-LiCl-NaCl and LiF-NaF-RbF. A particularly useful electrolyte is a molten salt comprising lithium bromide and potassium bromide, or a molten salt comprising lithium chloride and potassium chloride having a composition of about 59 mole percent lithium chloride and 41 mole percent potassium chloride. This is a eutectic which melts at about 352°C.

Referring more particularly to the drawings, a schematic test cell 10 as envisioned by the present invention is shown in FIG. 1. Negative aluminum-lithium metal electrode 11 and opposed, porous carbon positive electrode 12 are positioned from one another in spaced relationship. Electrode 12 is fixed rigidly to a steel current carrier 14. Both of the electrodes, 11 and 12, are immersed in an electrolyte 17 held in a heat-resistant glass container 18 which has been purged of atmospheric air and replaced by an inert gas. Electrode 11 is insulated electrically from electrode 12 by a cap 15 of an insulation material, as for example lava and ceramic or any other nonconducting material, inserted in the top of the container surrounding the electrodes so as to maintain the inert atmosphere in the container.

In operation potassium chloride crystals and lithium chloride crystals were mixed in a proportion of 59 mole percent lithium chloride and 41 mole percent potassium chloride and dried at about 500° C. for 2 hours and dry charged to an electric storage cell container as illustrated in FIG. 1, containing an electrode of activated carbon and an opposed negative, aluminum-lithium alloy electrode of 18 weight percent lithium to a level about one-half inch above the electrodes. The two electrodes were connected through an external circuit. The electric storage cell was placed in an electric furnace at 500° C.

The cell was preconditioned in the furnace by charging the cell to 3.30 volts open circuit and discharged to about 0.7 volt open circuit and back to 3.30 volts open circuit.

It has been found that a prototype of the device herein described produces a current exceeding 495 amperes per square foot of carbon in the prototype, which current can be delivered at rates of 22.2 horsepower per cubic foot of prototype in 1 minute and 28.1 horsepower per cubic foot of prototype in 15 seconds.

Figure 2:
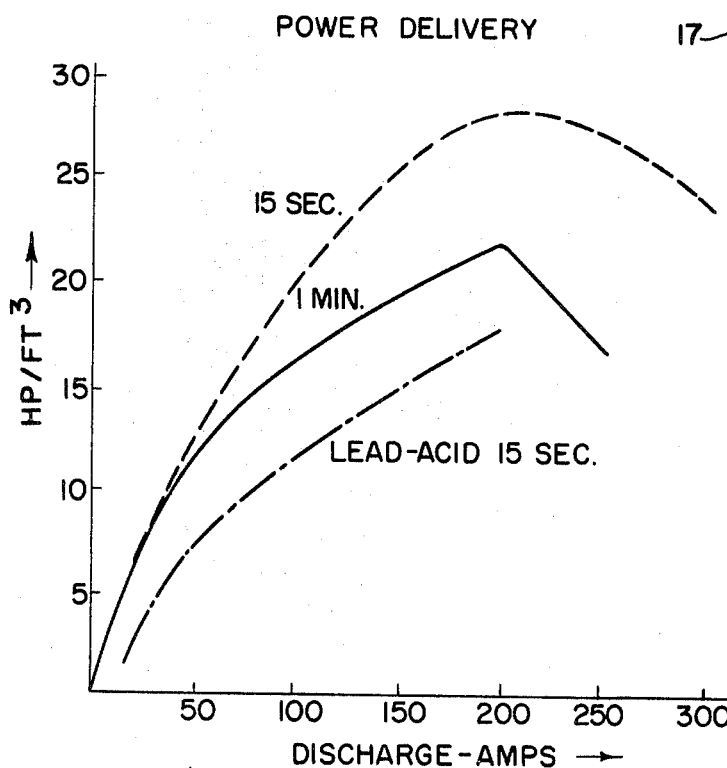
FIG. 2 is a comparative graph of power delivery of an electrical energy storage device of this invention and of a lead-acid electric energy storage device.

The delivered horsepower per cubic foot of the prototype applied as a function of the discharge current is shown in FIG. 2 with data for a conventional lead-acid storage battery included for purposes of comparison. It is noteworthy that the curve for delivered horsepower at a discharge interval of 1 minute for this electrical storage device lies considerably above the curve for the delivered horsepower for the conventional lead-acid storage battery for a discharge interval of 15 seconds.

Since the electric energy storage device operates at or above the fusion temperature of the electrolyte, the above-mentioned electrolytes are provided a means of heating to insure their remaining in the molten state.

The electric energy storage units herein described lend themselves to connection with units of similar construction either by connection of a number of units in series and parallel, or by utilization of a stack of electrodes.

The embodiments of the invention in which an exclusive property of privilege is claimed are defined as follows:

I claim:
1. A process for alloying lithium with aluminum comprising the steps of
   a. heating a mixture consisting essentially of lithium halide salt or salts to above its melting point,
   b. contacting a carbon cathode and an aluminum anode with said molten mixture,
   c. applying electrical potential across said cathode and anode,
   d. regulating said potential through said molten mixture to establish an effective electrolytic action in said molten mixture, and
   e. maintaining said electrolytic action in said molten mixture for a period sufficient to secure diffusion of lithium in said aluminum so that the anode is composed of from about 5 to 30 weight percent lithium and from about 70 to 95 weight percent aluminum, based on the total composition.
2. Process of claim 1 wherein said mixture consists essentially of lithium chloride and potassium chloride.
3. Process of claim 1 wherein said mixture consists essentially of lithium chloride-potassium chloride eutectic melting at about 325° C. and being 59 mole percent lithium chloride and 41 mole percent potassium chloride.
4. Process of claim 1 wherein said potential is maintained at substantially −3.35 volts with respect to chlorine reference electrode.
5. Process of claim 1 wherein a current density is maintained in the range of 200–500 milliamps per square centimeter.
6. process of claim 4 wherein a current density is maintained in the range of 200–500 milliamps per square centimeter.
7. The method of alloying lithium with aluminum which comprises passing a current through a heated fused bath of one or more halides of an alkali metal or an alkaline earth metal or a combination thereof which bath contains lithium ions, there being a carbon cathode and an anode of aluminum or an alloy of up to 95 weight percent of aluminum and no more than 30 weight percent of lithium in contact with the bath, and thereby passing lithium ions into contact with said electrode and alloying the lithium therewith to secure an electrode composed of from about 5 to 30 weight percent lithium and from 70–95 weight percent aluminum, based on total composition.
8. The method of claim 7 carried out in a secondary electrical energy storage tank, the alloy comprising at least 70 weight percent of aluminum and 5 weight percent of lithium, lithium of the alloy being subsequently ionized into the fused bath by reversal of the current flow.

PO-1050
(5/69)

UNITED STATES PATENT OFFICE
CERTIFICATE OF CORRECTION

Patent No. 3,607,413          Dated September 21, 1971

Inventor(s) Edward S. Buzzelli

It is certified that error appears in the above-identified patent and that said Letters Patent are hereby corrected as shown below:

Column 4, Line 32, Claim 3, "325°C should be ---352°C---

Column 4, Line 40, Claim 6, "process" should be capitalized

Signed and sealed this 22nd day of February 1972.

(SEAL)
Attest:

EDWARD M. FLETCHER, JR.          ROBERT GOTTSCHALK
Attesting Officer          Commissioner of Patents